Figure 7:
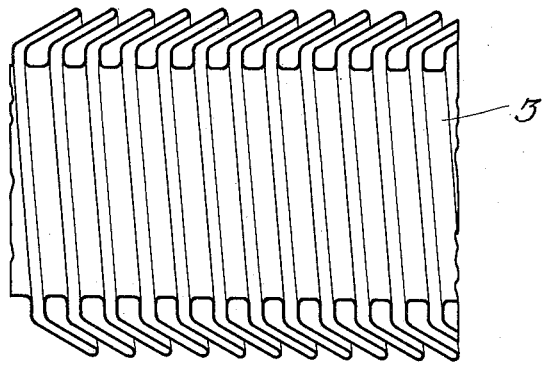

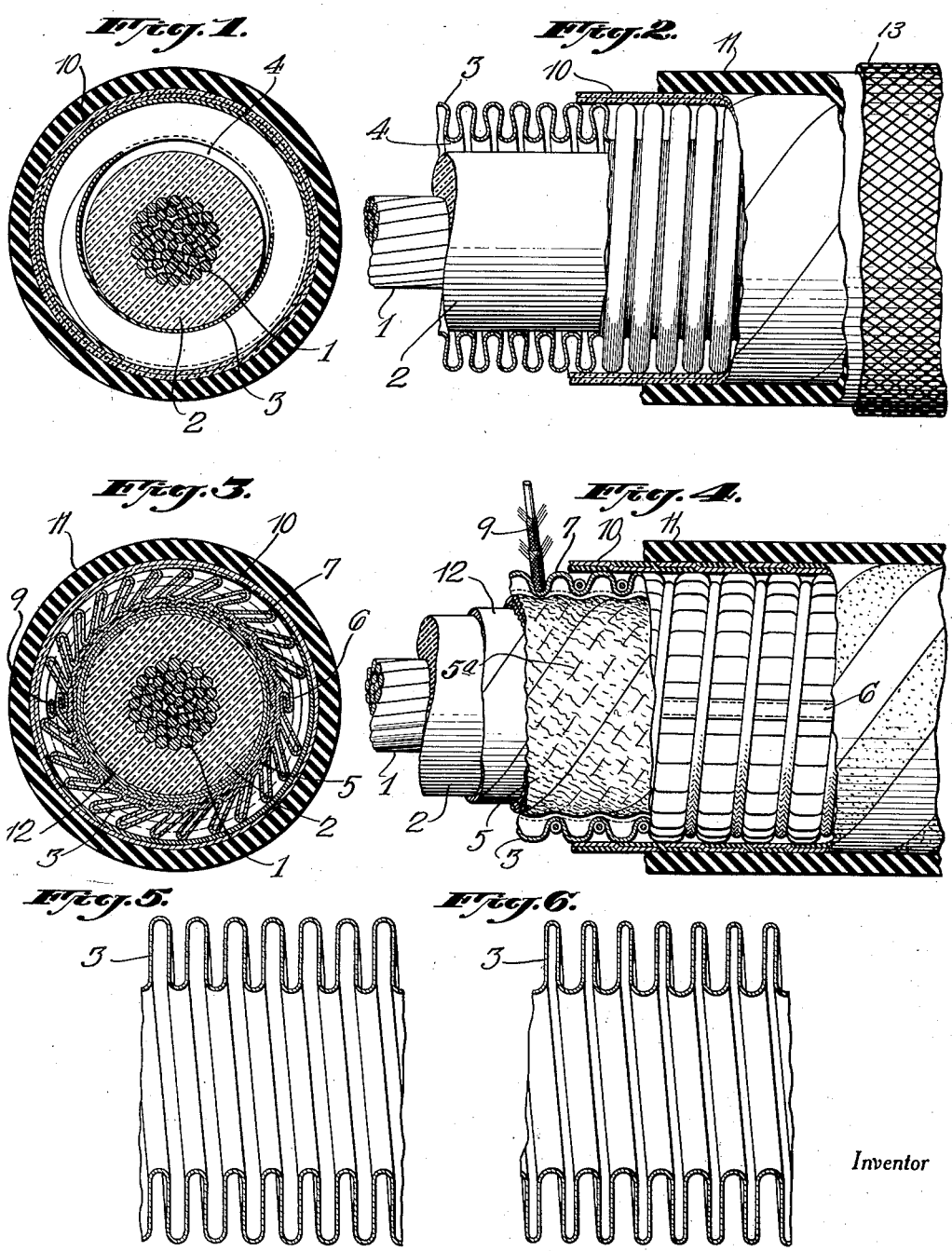

June 29, 1937.  F. L. AIME  2,085,563
FLUID IMPREGNATED ELECTRIC CABLE
Filed May 5, 1934  2 Sheets-Sheet 2

Inventor
FRANK L. AIME.
By
Attorney

Patented June 29, 1937

2,085,563

UNITED STATES PATENT OFFICE 2,085,563

FLUID IMPREGNATED ELECTRIC CABLE

Frank L. Aime, New York, N. Y., assignor to Anaconda Wire & Cable Company, New York, N. Y., a corporation of Delaware Application May 5, 1934, Serial No. 724,000

9 Claims. (Cl. 173—266)

This invention relates to cables having insulating wrappings impregnated with an insulating fluid and sheathed with a metallic sheath. More particularly it relates to a cable construction in which the cable or conductor is tightly wrapped with paper or similar fibrous wrapping which is impregnated with oil or other insulating fluids and sheathed with a metallic sheath, and having means to maintain the wrapping impregnated at all times with the insulating fluid. This invention relates particularly to the construction of the sheath and the method with which the sheath is applied and the materials with which it is made and the means thereby for maintaining the cable insulation under complete impregnation at all times.

The conductors in cables are subjected to varying amounts of electric current and are therefore subjected to heating effects which at times increase the temperature of the conductor and of its enclosing wrappings very considerably and when the current decreases, permits this temperature to drop. When the insulating wrappings are thus heated, the oil or insulating fluid expands. A considerable pressure is exerted within the sheath of the cable due to the expansion of the impregnating fluid and the expansion of the other materials making up the core of the cable itself, such as copper and fibrous wrappings, which expansion may be of the order of 1% to 3% of the volume of the cable within the sheath. When the cable is covered with a lead sheath, the pressure thus created within the sheath may be so great as to expand the sheath beyond the yield point of the lead and thus stretch it. When the cable cools again the lead, being stretched, does not return to its original size and therefore creates voids or empty spaces within the cable under the sheath.

It is well known that the creation of such voids tends to ionization and thus produces deterioration of the cable insulation in a much shorter time than would be the case if those voids did not exist and the cable were operating normally.

The object of the present invention is to provide a sheath comprised of metal of relatively high elasticity and to provide said sheath with means to permit the sheath to expand with the expansion of the materials within the cable core, and to contract with the contraction of said materials so that the creation of voids within the sheath is eliminated. In this manner ionization within the sheath is reduced if not eliminated and the life of the cable thereby extended beyond the life of ordinary oil impregnated cables now existing.

By the practice of the present invention it is possible to use insulation thicknesses smaller than are usually used in solid type cables, and approaching or equalling those usually used in the so-called oil-filled type cables. Such decreased amount of insulation is successful only when the impregnation of the insulating wrappings is maintained 100% or nearly so during the service life thereof.

It will be seen by those familiar with the art that the construction herein described provides a cable whose characteristics are that of the so-called oil-filled type, while it is constructed in a manner of the solid type of cable. At the same time it becomes unnecessary for the cable of this invention to be connected to external oil reservoirs which are used for the purpose of allowing for the expansion and contraction of oil in the cable. It is obvious, therefore, that this construction will result in a cable fully as efficient and satisfactory as the more expensive oil-filled type of cable, but requires much less expense in its installation due to the necessity of the reservoirs mentioned above.

The various features of the invention are illustrated in the accompanying drawings in which Fig. 1 is a cross-section of the cable and the enveloping sheath of one type. Fig. 2 is a side elevation partly in section showing the manner of applying the sheath of the present invention to the cable of Fig. 1. Fig. 3 is a cross-section of a cable with a modified form of the sheath of the present invention. Fig. 4 is a side elevation partly in section of the cable of Fig. 3.

Figure 8:
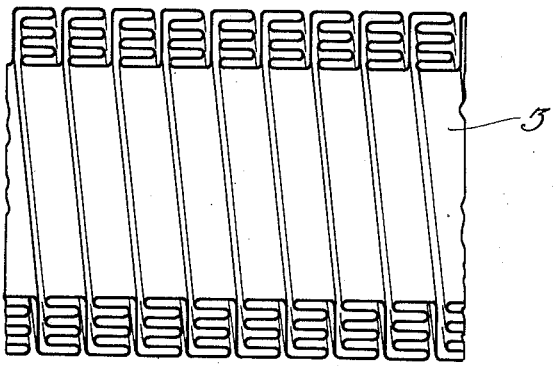
Figure 9:
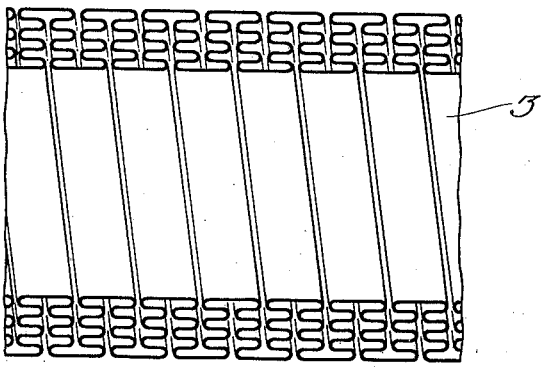

Figs. 5, 6, 7, 8, 9 are cross-sections of the cable sheath showing various modifications of the sheath contemplated within the scope of the present invention.

In the embodiment shown in the accompanying drawings, the conductor 1 is within and surrounded by successive layers of paper wrapping 2 thereby providing a conductor having a sufficient thickness of insulation between it and enclosing sheath 3 which may be of copper or other suitable material.

In Fig. 1 the cable composed of the wrapped conductor is inserted in the sheath 3 which is formed in the shape shown in Fig. 2. Sheath 3 is preferably a seamless copper tube drawn over the cable with the various lengths of the tube being joined together to form a seal such as by threaded portions, one end fitting over the end of another and the two soldered together by means of a soft solder. Between the periphery of the cable core and the inside of the sheath consisting of the tubing, there is an annular space 4 which permits of the cable being drawn into the tube. After sufficient number of lengths of tubing are drawn over the cable and their ends joined together to make an oil-tight sheath, the cable is then impregnated by the usual means known to the art and which is usually referred to as oil-filled type of impregnation.

In Fig. 3 the conductor insulation 2 is surrounded by a metal or metallized shielding tape 12 of known construction and a series of wrappings of loosely taped paper 5 or similar material sometimes called "Krinkle" paper is placed thereover and over wrapping 5 is applied the sheath 3. The sheath 3 consists in this case of a plaited sheet of copper or similar material after which the sheet is formed into a circular shape around the cable and locked together by means of a lock joint seam as shown at 6, this seam being tin coated and soldered during the process of forming the sheath around the cable.

The shielding tape above referred to will be grounded at convenient intervals to the sheath. For this purpose the paper 5 may be made up with copper wire 5ª stitched into it.

After the sheath is jointed together it is corrugated as at 7 in Fig. 4. After the corrugating process, the sheath may be wrapped loosely with a wire 9 (Fig. 4) of copper or of the same material as the sheath to assist the sheath in retaining its shape. Over the sheath 3 after it is corrugated may be applied two or more layers of paper tape 10 and over the tapes one or more layers of reinforced rubber 11 (Fig. 4) which may be self-vulcanizing. Over the rubber 11 may be applied if desired, a braid 13 as the outside covering, the object of these wrappings over the sheath 3 being to provide a protective cover over the sheath to save it from deterioration from external causes. It will be understood that other forms of construction may be used for this purpose by varying the materials and methods of application over the sheath 3.

It will be understood that the principal object of this invention, particularly of the sheath construction shown herein is to provide a means for permitting the expansion of the cable and of its contracting again to its original size to prevent formation of voids. This is accomplished in the construction as shown in Figs. 1 and 2 by the pressure formed within the cable distorting the side walls of the corrugated portions of the tubing 3 thus permitting a greater volume underneath the sheath. The sheath is so constructed that this distortion does not occur of sufficient magnitude to force the metal beyond its yield point and when cooling occurs, the metal returns to its original shape as desired. In the construction of Figs. 3 and 4 there are two kinds of expansion permitted, the principal one being the expansion made possible by the bulging of the plaited copper forming the sheath and the distortion of the corrugations the corrugations therein also permitting the cable to be bent and handled without injury. Of course, it is understood in Figs. 3 and 4 that this cable is impregnated in the same manner as stated above after the sheath is applied.

In the modifications of sheath 3 illustrated in Figs. 5 to 9 inclusive, I have shown different types of corrugations adapted for use in the present invention, each of which modifications may have peculiar advantages for use under certain service conditions.

Having broadly and specifically described the present invention, it is apparent that many modifications and departures may be made therein without departing essentially from the nature and scope thereof as may be included within the following claims.

What I claim is:

1. An oil impregnated cable comprising an electrical conductor, a wrapping of oil absorbing material therearound, and an enclosing expansible and contractible sheath of copper having angular annular pleats overlapping yet clearing one another to impart to the said sheath a relatively high flexibility.

2. In an oil impregnated cable, a sheath consisting of a plurality of united sections of seamless metal tubing of relatively high elasticity corrugated helically and radially to render said tubing flexible and to provide means to expand and contract said sheath upon the expansion and contraction of materials contained within said sheath.

3. In an oil impregnated cable, a tubular seamless sheath of plaited copper helically corrugated to render the said sheath flexible and to provide means to expand and contract said sheath upon expansion and contraction of materials contained within said sheath.

4. In a fluid impregnated cable, a core of wrapped insulating material surrounded by a metal shielding tape grounded at convenient intervals to the sheath and a series of comparatively loosely applied fibrous wrappings over the shielding tape and sheathed in a seamless metal sheath having annular angular pleats which render said sheath flexible and to provide means to expand and contract said sheath upon expansion and contraction materials contained within said sheath.

5. In a fluid impregnated cable, a core of wrapped insulating material surrounded by a metal shielding tape grounded at convenient intervals to the sheath and a series of comparatively loosely applied fibrous wrappings over the shielding tape and sheathed in a copper sheath corrugated helically and radially to render said sheath flexible and to provide means to expand and contract said sheath upon expansion and contraction materials contained within said sheath and a reinforcing element seated in the outer groove of the helical corrugation.

6. An oil impregnated cable comprising an electrical conductor surrounded by oil impregnated insulation, an enclosing tubular metal expansible and contractible sheath corrugated to impart relatively high flexibility thereto, the inner diameter measured across the inner portions of the corrugations of said sheath being substantially equal to the diameter of said impregnated insulation.

7. An oil impregnated cable comprising an electrical conductor, a body of oil absorbing insulating material therearound and a plaited and corrugated tubular copper sheath, the corrugations and pleats imparting a relatively high flexibility and expansibility and contractibility to the sheath and the minimum inside diameter of the sheath being substantially or approximately equal to the outside diameter of said insulation.

8. An oil impregnated cable comprising an electrical conductor, a body of oil absorbing material therearound, a corrugated expansible and contractible metallic sheath of relatively high elasticity, and a protective envelope enclosing such corrugated sheath.

9. An oil impregnated cable comprising an electrical conductor, a wrapping of oil absorbing material therearound, a seamless metal tubing of relatively high elasticity corrugated both helically and radially to render said tubing flexible and to provide means to expand and contract said sheath upon the expansion and contraction of materials contained within the sheath and a covering engaging and surrounding the exterior of said sheath.

FRANK L. AIME.